United States Patent [19]

Musschoot

[11] 4,168,774
[45] Sep. 25, 1979

[54] VIBRATORY APPARATUS
[75] Inventor: Albert Musschoot, Barrington, Ill.
[73] Assignee: General Kinematics Corporation, Barrington, Ill.
[21] Appl. No.: 824,854
[22] Filed: Aug. 15, 1977

Related U.S. Application Data

[63] Continuation-in-part of Ser. No. 712,331, Aug. 6, 1976, abandoned, which is a continuation-in-part of Ser. No. 692,968, Jun. 4, 1976, abandoned.

[51] Int. Cl.$^2$ ............................................. B65G 25/00
[52] U.S. Cl. ................................ 198/751; 198/762; 198/768; 198/770; 74/61; 74/87
[58] Field of Search .............. 198/505, 750, 752, 760, 198/761, 762, 768, 770, 855, 751; 74/61, 87

[56] References Cited

U.S. PATENT DOCUMENTS

| 2,609,965 | 9/1952 | Kast | 198/505 |
|---|---|---|---|
| 2,758,704 | 8/1956 | Spurlin | 198/761 |
| 2,852,162 | 9/1958 | Nauta | 198/752 |
| 2,913,146 | 11/1959 | Dickerson | 198/505 |
| 2,993,585 | 7/1961 | Musschoot | 198/761 |
| 3,128,911 | 4/1964 | Morris et al. | 198/762 |
| 3,216,557 | 11/1965 | Morris et al. | 198/761 |
| 3,358,815 | 12/1967 | Musschoot et al. | 198/761 |
| 3,430,751 | 3/1969 | Bateson | 198/505 |
| 3,716,130 | 2/1973 | Morris | 198/762 |
| 3,724,720 | 4/1973 | Bullivant | 198/505 |

Primary Examiner—Joseph E. Valenza
Attorney, Agent, or Firm—Wegner, Stellman, McCord, Wiles & Wood

[57] ABSTRACT

This invention relates to a variable speed vibratory conveyor or feeder which comprises a material-carrying member mounted on isolation springs, and an exciter connected to the member by a spring system. The exciter carries a rotatably mounted eccentric weight for imparting vibrations to the material-carrying member, and a hydraulic control system is provided for varying the position of the eccentric weight relative to its axis of rotation in order to vary the amplitude of the vibrations imparted to the material-carrying member.

2 Claims, 8 Drawing Figures

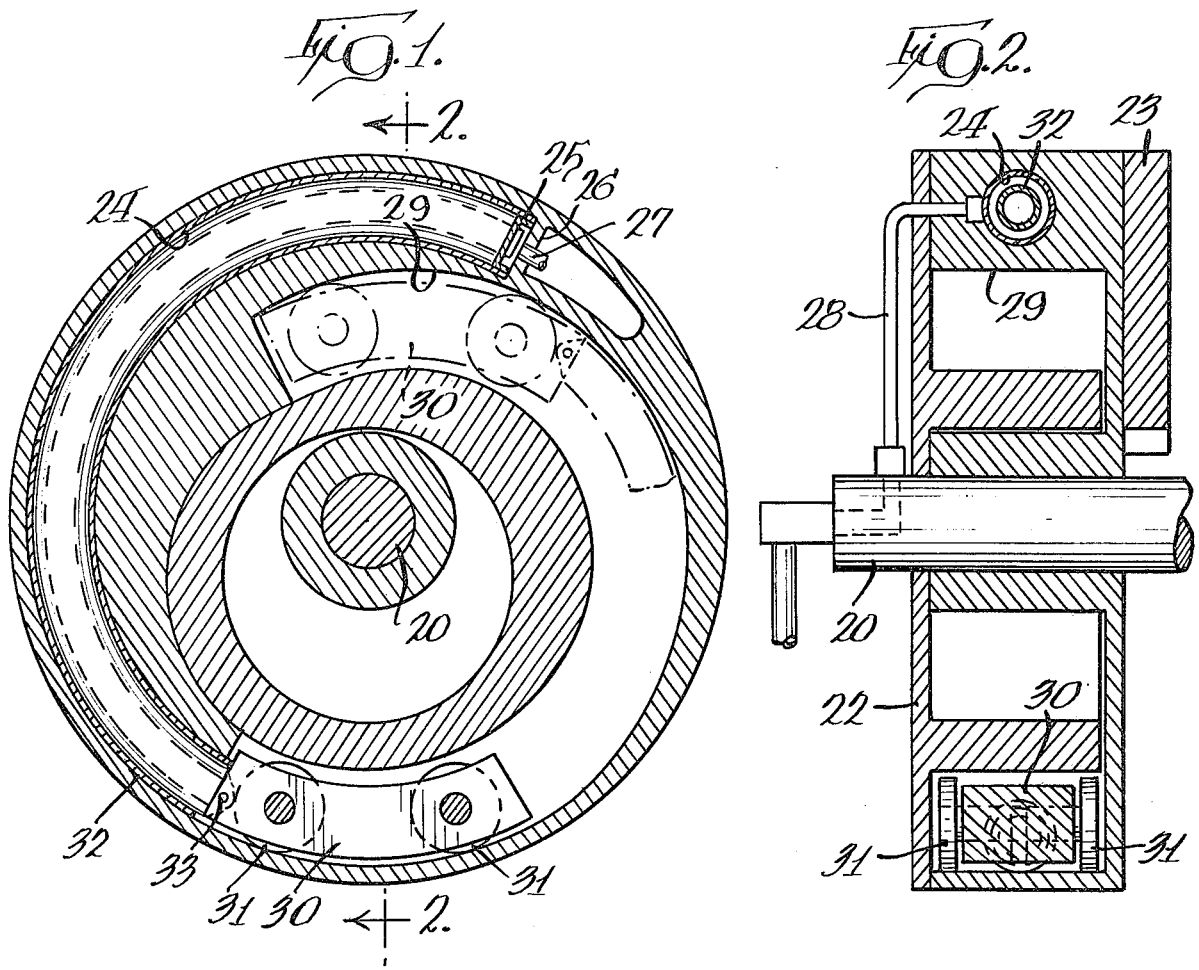
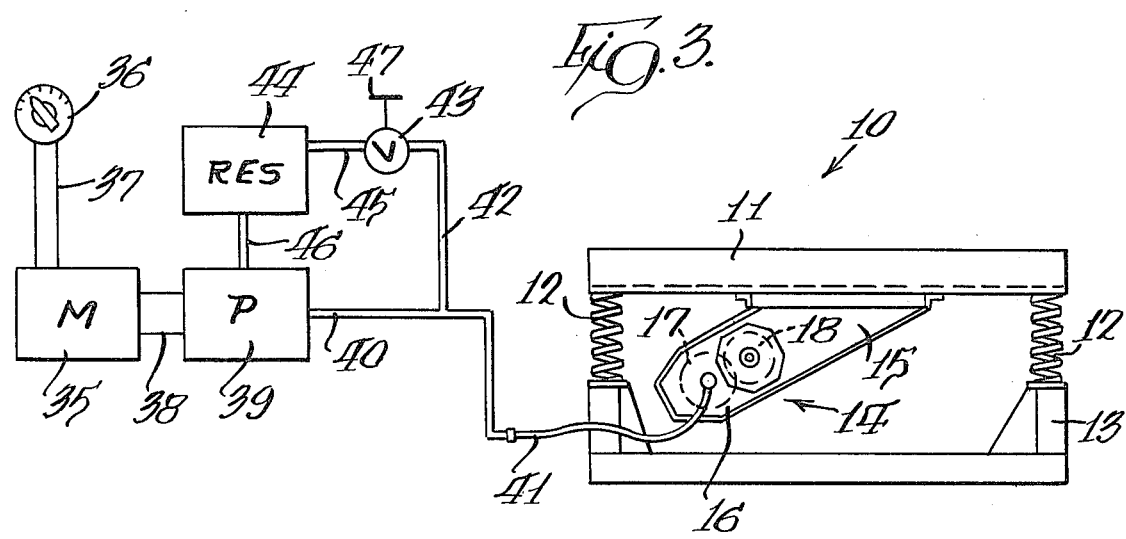

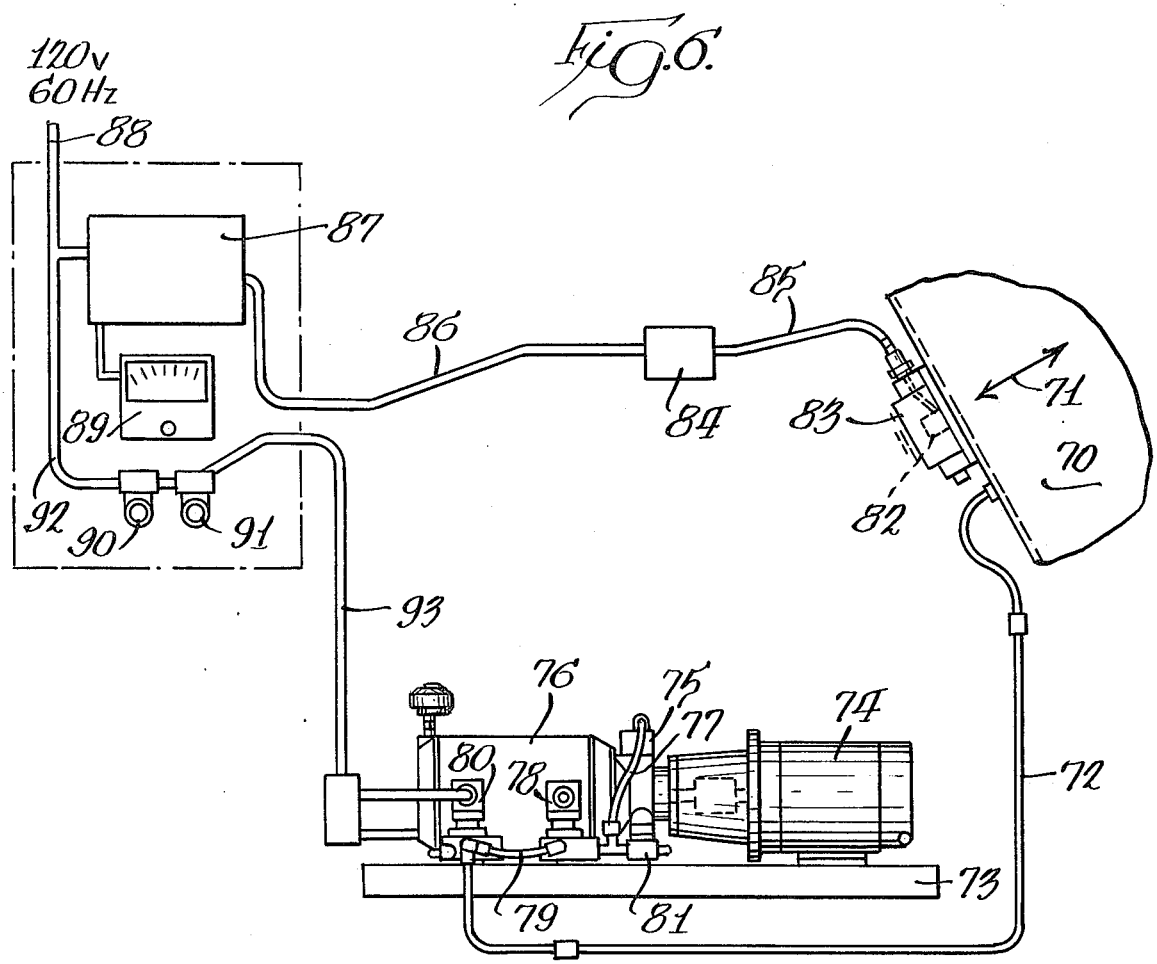

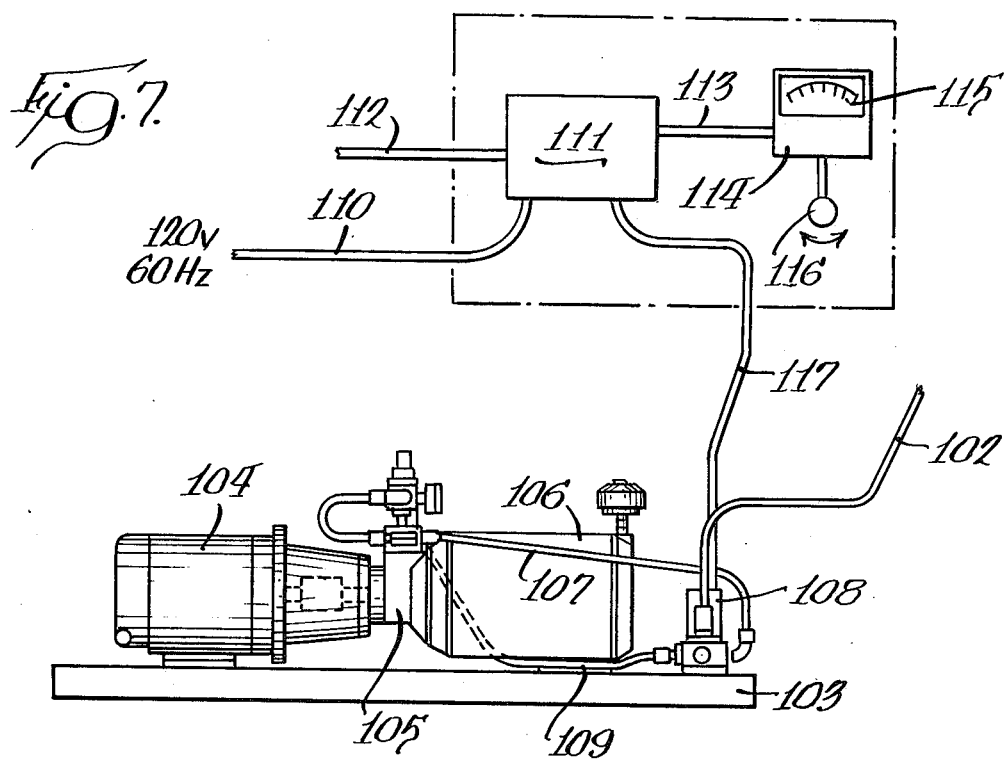
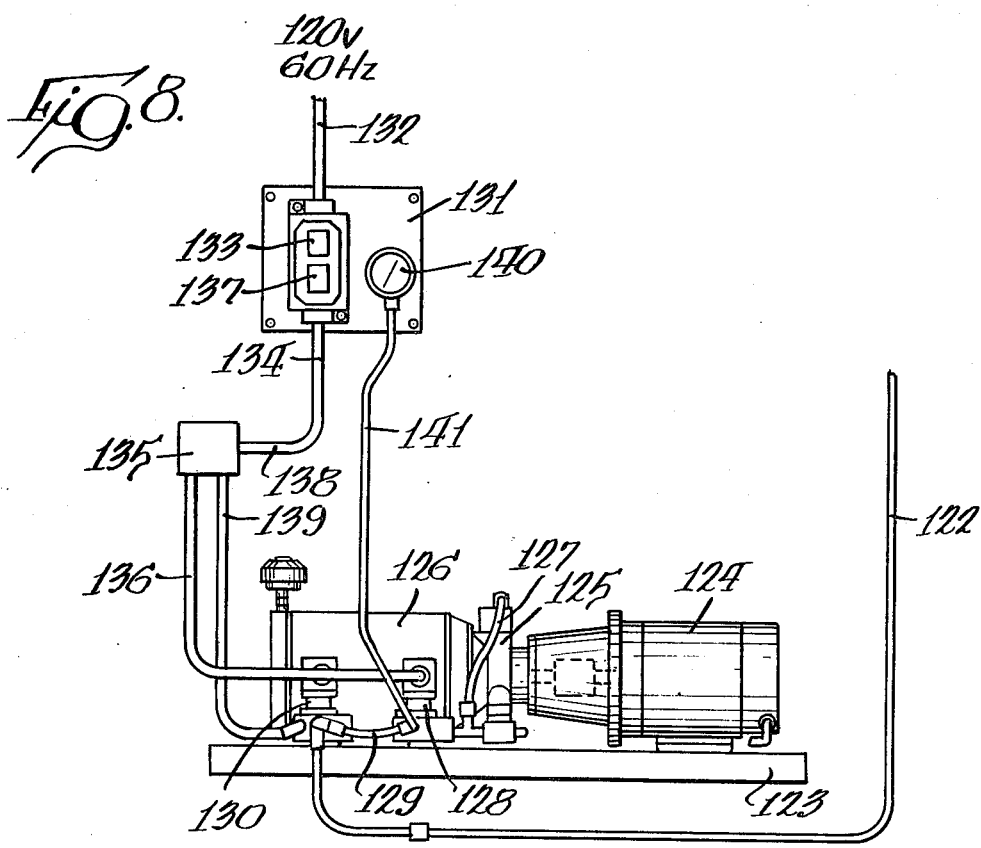

VIBRATORY APPARATUS

CROSS-REFERENCE

This application is a continuation-in-part of my copending application Ser. No. 712,331 filed Aug. 6, 1976, now abandoned which in turn was a continuation-in-part of my application Ser. No. 692,968 filed June 4, 1976, now abandoned.

BACKGROUND OF THE INVENTION

Vibratory feeders have a number of applications such as, for example, the feeding of pulverulent material in various industrial processes. An example of a vibratory feeder of this type is shown in my earlier U.S. Pat. No. 3,089,582. The apparatus in said patent, while operating efficiently to feed material at a uniform rate, operates at a constant speed and hence produces a constant rate of feed. Obviously, it is desirable that in many installations the rate of feed be variable. Such a variable rate of feed was achieved by my subsequent U.S. Pat. No. 3,358,815. In the latter patent, control is effected pneumatically, i.e., air pressure is utilized for the purposes described. While operating effectively, there are disadvantages to a pneumatic control, which disadvantages can be overcome by means of the present invention.

SUMMARY OF THE INVENTION

In many installations, space and air cleanliness considerations do not easily permit the installation of large air compressors necessary to operate a fully pneumatic system such as that shown in my U.S. Pat. No. 3,358,815. Furthermore, pneumatic control does not lend itself readily to remote operation, i.e., to be controlled from a remote point. In many commercial and industrial installations, it is highly desirable to provide a control system which can be regulated from a point substantially removed from the location of the actual feeder itself. Accordingly, I have provided by this invention a control system which utilizes a minimum of power and space and yet permits of remote operation, thus overcoming many of the objections which could be raised against a pneumatic system.

BRIEF DESCRIPTION OF THE DRAWINGS

FIG. 1 is a side elevational view of a counterweight wheel of the present invention;

FIG. 2 is a vertical section taken along line 2—2 of FIG. 1;

FIG. 3 is a diagrammatic view of a hydraulic control system as embodied in a vibratory feeder.

FIG. 6 is a diagrammatic view of a modified hydraulic control system;

FIG. 7 is a view like FIG. 6 of a further form of hydraulic control system; and

FIG. 8 is a view like FIG. 6 of yet another modified form of control system.

DESCRIPTION OF THE PREFERRED EMBODIMENT

Figure 4:
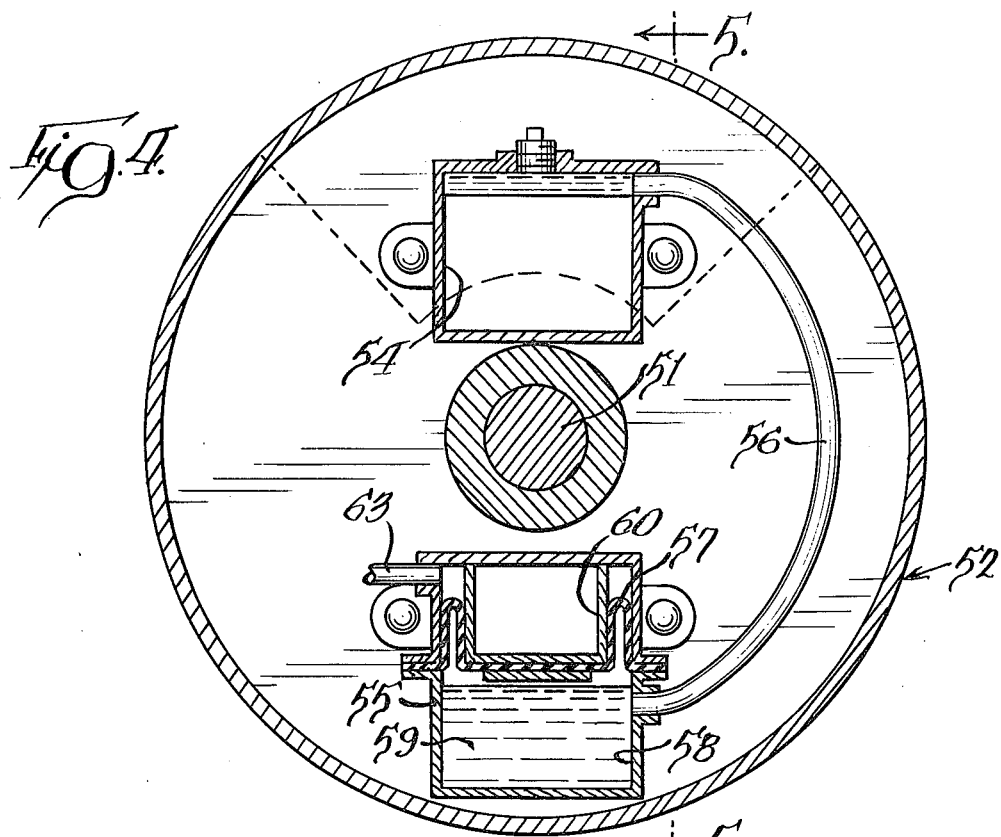
FIG. 4 is a view like FIG. 1 showing a modified form of the invention.

Referring now to FIG. 3 of the drawings, there is shown a vibratory apparatus similar in many respects to that shown in my U.S. Pat. No. 3,358,815. The vibratory apparatus includes a material-carrying member in the form of a trough 11 supported upon isolation springs 12, resting in turn upon a base 13. Secured to the underside of the trough 11 is an exciter 14. The supporting means include parallel frame members 15 secured to the underside of the trough 11, and a second pair of frame members 16 which support an electric motor 17, normally of the constant speed type. A pair of rubber shear springs 18 are compressed between the frame members 15 and 16 on each side, to constitute a spring system for transmitting vibration generated by rotation of the motor 17 through the frame members 16 and 15 to the vibratory trough 11. The function and mounting of the shear springs is as shown in my previously mentioned patents.

The electric motor 17 is provided with a motor shaft 20 carrying a counterweight member at each end of the shaft. The counterweight member is in the form of a wheel 22 having a fixed counterweight 23 secured thereto. Located within each counterweight wheel 22 is an arcuate cylinder 24 having a piston 25 movable therein. The cylinder 24 is closed at one end as indicated at 26, which closure is provided with a hydraulic passage 27. A hydraulic conduit 28 connects to the passage 27 so as to supply hydraulic fluid under pressure thereto in a manner hereinafter to be described. Within each wheel 22 is an arcuate channel 29 in which a weight 30 is movable on wheels 31 connected thereto. A connecting rod 32 is connected at one end to the weight 30 and at its other end to the piston 25, the connection to the weight being pivotable as illustrated at 33.

A variable speed electric motor 35 is governed by a control 36 and connected thereto by wires 37. The control 36 may be located at any desired point in the plant or factory and utilized to control the speed of the motor 35.

A drive shaft 38 connects the motor with a positive displacement pump 39 having its discharge 40 connected to the hydraulic conduit 28 by means of the hydraulic line 41. Also connected to the discharge 40 of the pump is a bypass passage 42 connected by means of an orifice 43 to a reservoir 44 through the medium of line 45. The reservoir is connected to the intake of the pump by means of the hydraulic passageway 46. As illustrated in the drawings, the orifice 43 is adjustable by the means indicated at 47.

In operation, the control 36 is set to the desired position to produce a predetermined operational speed of the motor 35. The result is a discharge by the pump 39 into the lines 40, 41, 28 and 27, into the cylinder 24 to operate against the piston 25 therein. This force tends to move the weight 30 along the arcuate path defined by the channel 29 and thus to move the weight 30 not only closer to the axis of rotation of the motor shaft 20, but also toward a position where it approaches the fixed counterweight 23. When the weight is in the position shown in solid lines in FIG. 1, it is opposite the fixed counterweight 23 and hence tends to offset or counterbalance the fixed weight. When moved in the manner just described, the counterbalancing effect is reduced and, in fact, when moved to the position shown in dotted lines in FIG. 1, the weight 30 is added to the weight 23 is producing the maximum vibration. Because the channel 29 curves inwardly (radially), the weight has a tendency to move from the position shown in dotted lines to the position shown in solid lines as the counterweight wheel is rotated.

The orifice 43 is adjusted at least initially so as to maintain the pressure in the cylinder 24 substantially constant with a given speed of the motor 35. As the speed of the motor is increased, the pressure will increase, thereby serving to move the weight 30 in the channel 29.

The result of the foregoing construction is to produce a variable rate feeder, the rate of which can vary from substantially zero when the two weights 23 and 30 are on opposite sides of the motor shaft and are thus in balancing relationship, to the maximum desired when the weights are on the same side of the shaft and operate together.

Figure 5:
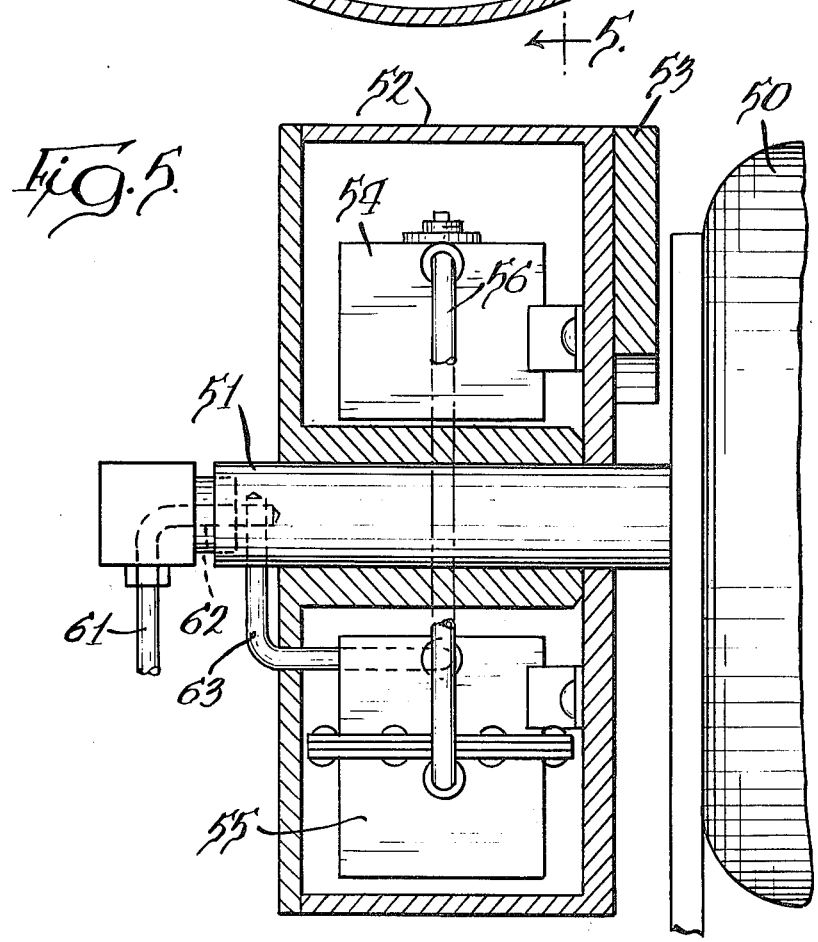
FIG. 5 is a sectional view taken along line 5—5 of FIG. 4.

Referring to the modified form shown in FIGS. 4 and 5, there is provided a motor 50 corresponding to the motor 17 of the previous embodiment, which motor is provided with a double-ended shaft 51, at the ends of which are mounted a pair of counterweight wheels 52. Only one of the counterweight wheels is shown, it being understood that the opposite end of the shaft 51 carries a similarly constructed counterweight wheel.

The counterweight wheel 52 carries a fixed eccentric weight 53 mounted thereon. In the interior of the wheel 52 is a first reservoir 54 and a second reservoir 55 with a fluid conduit 56 interconnecting the two reservoirs. The reservoir 55 is divided into two chambers by a diaphragm 57. The diaphragm provides a first chamber 58 which is adapted to contain a heavy fluid such as mercury 59, and the diaphragm provides a second chamber 60. Means are provided for introducing hydraulic fluid under pressure into the second chamber 60 so as to cause the mercury 59 to be forced from the first chamber 58 through the conduit 56 into the first reservoir 54. It will be noted that the reservoirs 54 and 55 are unequally spaced from the center of shaft 51, the reservoir 54 being closer thereto.

Hydraulic fluid under pressure is provided to conduit 61 (the counterpart of conduit 41 in the previous embodiment) by the electric motor and hydraulic pump system previously described and as shown in FIG. 3. The conduit 61 connects to a passage 62 drilled in the shaft 51, which in turn connects to a second conduit 63 opening into the first chamber 58 in the reservoir 55.

When hydraulic fluid under pressure from the pump 39 is supplied to conduit 61, the pressure in the first chamber 60 forces the diaphragm 57 downwardly and thus the heavy fluid mercury will pass through the conduit 56 into the reservoir 54. Thus, weight will be subtracted from one side of the counterweight wheel and added to the other. When all of the mercury is in the reservoir 54, its weight added to the weight of the fixed eccentric 53 will create the greatest weight imbalance and thus the largest amplitude vibrations. When pressure in the conduit 61 is relieved, and because reservoir 55 is spaced radially outwardly of the reservoir 54, centrifugal force will move the mercury 59 back into the chamber 55. Obviously, all of the mercury need not be displaced from one chamber to the other, thus substantially infinite variations in amplitude of vibrations can be achieved through the system.

By utilizing a hydraulic control with either the counterweight wheel embodiment shown in FIGS. 1 and 2, or FIGS. 4 and 5, not only may the control be remote from the apparatus, the control is more effective and positive. In addition, the hydraulic system constitutes a closed circuit, so filtering equipment, etc., is not necessary as would be required in a pneumatic system, and an electric motor of as little as 1/60 h.p. may be used to provide the controlled fluid pressure. This contrasts with the motor of approximately 1 h.p. necessary in an air system. Inasmuch as apparatus of the type shown herein is often used to feed coal and hence is in a very dusty and dirty atmosphere, the advantages of providing a closed fluid system are apparent.

It will be noted that in the fluid system of FIGS. 4 and 5 the mercury 59 is impelled toward the chamber 58 farthest from the axis of rotation of the wheel by the centrifugal force generated with such rotation. Normally, the wheel is rotated at a constant speed. Hence, pressure is constantly exerted by the mercury in the system against the diaphragm 57. Hydraulic pressure in the line 63 is exerted against the diaphragm, which then acts something like an accumulator, i.e., the higher the pressure in the line 63, the more mercury will be pushed out of the chamber 58 into the line 56 and finally into the chamber 54. This characteristic of the system of FIGS. 4 and 5 allows the system to be combined with a number of relatively sophisticated hydraulic control systems, and when so combined, provides a wide range of operations which may be precisely controlled.

Referring now to FIG. 6, there is shown a somewhat more sophisticated system for permitting accurate control of the rate of feed of the vibratory feeder from a position remote from the feeder itself. As shown in that figure, 70 indicates an exciter like the exciter 14 of FIGS. 4 and 5 secured to a vibratory apparatus like the feeder of FIG. 3. It will be assumed that for FIGS. 6, 7, and 8, the stroke controlling system is like that of FIGS. 4 and 5, and the direction of vibration, i.e., the stroke of the feeder, is parallel to the double-ended arrow 71.

In FIG. 6, 72 indicates a hydraulic line which connects with conduit 63 of FIGS. 4 and 5. Mounted upon a base 73 is an electric motor 74 connected to drive a hydraulic pump 75. The pump 75 has its intake connected to a reservoir 76 and a discharge conduit 77 which is controlled by a solenoid valve 78. The valve 78 directs fluid from the pump to a hydraulic line 79 connected to the line 72. A second solenoid valve 80 is arranged to connect the line 72 to the reservoir 76. In the hydraulic system there is provided a relief valve 81 which will open at excessive hydraulic pressure and direct fluid from the discharge of the pump into the reservoir.

Mounted on the exciter 70 is an accelerometer 82 which is responsive to the vibrational stroke of the vibratory apparatus. The accelerometer 82 is secured to a junction box 83 and generates an electrical signal which passes via the conduits 85 and 86 and junction box 84 into an accelerometer monitoring system 87. The monitoring system 87 is powered by 120 volt alternating current from conduit 88 and the monitor sends its output to a meter 89 having a needle indicating the length of stroke of the vibratory apparatus.

Push buttons 90 and 91 serve to direct electrical current from the 120 volt line 92 into the conduit 93 connected to the solenoids 78 and 80 for operating the same. When the button to operate the solenoid 78 is depressed, the electric motor 74 will also be energized. Both the electric motor and the solenoid 78 will be de-energized when the button is released.

As indicated earlier, the control system including the meter 89 and manual push button switches 90 and 91 may be remote from the vibratory apparatus. A point to note is that the system shown for increasing and decreasing the stroke of the vibratory apparatus or feeder, particularly that shown in FIGS. 4 and 5, is one particularly useful in the type of hydraulic control circuits described herein. The reservoir 58 and the diaphragm 57 operating in combination with the centrifugal force generated by the rotation of the wheel 52 and the fluid 59 act in the nature of an accumulator, thus creating a constant back pressure on the hydraulic control system connected thereto. Thus, in the system just described, the motor 74 need be operated only when an increase in pressure in the hydraulic control system is desired.

The accelerometer 82 generates a signal which reflects the length of stroke of the feeder and that length of stroke is physically displayed on the meter 89. If it is desired to increase the stroke, the proper push button 90 is depressed, which energizes the motor 74 and also opens the solenoid valve 78 directing fluid under pressure into the conduit 72. When the push button 90 is released, the motor stops and the valve closes. When it is desired to decrease the stroke, the push button 91 is operated to operate the solenoid valve 80 allowing fluid in the conduit 72 to pass to the reservoir. The resulting decrease in stroke of the vibratory feeder will be reflected in the meter 89. Thus, either button 90 or 91 may be depressed to increase or decrease the stroke until the desired stroke is achieved.

A further control apparatus is shown in FIG. 7. As shown therein, the conduit 102 is connected in the same manner as the conduit 72 or 61, i.e., ultimately to the conduit 63 for supplying fluid pressure on one side of the diaphragm 57 opposing the pressure generated by the fluid 59.

A base 103 supports an electric motor 104 connected to drive a hydraulic pump 105. A reservoir 106 is also on the base. Fluid discharged from the pump 105 is directed into a hydraulic line 107 connected to an electrically operated servo valve 108. The servo valve directs the fluid under pressure in the line 107 into the conduit 102, or into a hydraulic line 109 connected to the reservoir 106.

Electrical power is supplied through 120 volt line 110 connected to a set-point controller 111. The controller operates to compare a signal reaching it through an electrical line 113 and created by a signal generator 114 having a visual scale 115 thereon and controlled by a rotatable manual control knob 116.

The apparatus of FIG. 7 is particularly adapted for use in a situation where the discharge from the vibratory feeder is onto a belt conveyor which conveys the material fed to it at a uniform rate by the feeder to a point of use. A belt scale is provided in such a system to weigh the material on the belt conveyor and to generate a signal reflecting said weight into a line 112 which is connected to the set point controller 111. The actual weight of material on the belt conveyor and sensed by the belt conveyor scale reflects, of course, the rate of feed of the vibratory apparatus which in turn is determined by the length of the stroke of the vibratory apparatus. The desired weight may be set on the scale 115 by operation of the manual knob 116 and the signal generated by the signal generating apparatus 114 is compared in the controller with the signal from the belt scale connected to the line 112. If there is a difference between the two signals, the set point controller operates to direct an electrical signal into the line 117 connected to the servo valve 108. With the motor 104 and pump 105 operating constantly, the servo valve 108 controls an orifice to establish the pressure in the line 102, and directs the output of the pump into the line 109 for passage through the orifice and return to the reservoir. Signals received by the servo valve from the controller then result in a change in orifice size in the servo valve, thereby increasing or decreasing the pressure in the line 102 and hence the stroke of the vibratory apparatus.

The system shown in FIG. 7 will maintain a constant desired feed of the vibratory apparatus as reflected in the weight of the material discharged therefrom onto the belt conveyor and sensed by the belt conveyor scale. Any variations in feed will be corrected in the manner described, i.e., any differences between the signal received from the belt scale and from the generating means 114 will result in operation of the servo valve and a correcting change in pressure in the conduit 102. Likewise, if it is desired to increase or decrease the stroke, the manual knob 116 is rotated one way or the other until the meter 115 reads the new desired stroke, whereupon the controller 111 will again operate to bring the signals from the belt scale and generator 114 into parallel by suitable modification of pressure in the conduit 102.

A simpler form of control is shown in FIG. 8 wherein there is provided a hydraulic line 122 connected similarly as the lines 102 and 72 to operate the stroke modifying device of FIGS. 4 and 5. Mounted on a base 123 is an electric motor 124, a pump 125 and a reservoir 126. The discharge of the pump is into a conduit 127 which is controlled by a first solenoid operated valve 128 directing fluid from the pump to a hydraulic line 129 connected to the line 122. A second solenoid valve 130 operates to connect line 122 to the reservoir.

Mounted on a control panel 131 is an electrical conduit 132 bringing in 120 volt alternating current, and a pair of manually operated switches 133 and 137. The switch 133 directs an electrical signal through conduit 134 and junction box 135 into an electric line 136 connected to the solenoid operated valve 128. Push button 137 directs electrical current through the lines 138 and 139 to operate the solenoid valve 130. Mounted on the control panel 131 is a meter 140 which is responsive to fluid pressure in line 141 connected to sense pressure in conduit 129.

The apparatus of FIG. 8 is purely manually operated by depressing either button 133 or 137, the pressure in the line 122 may be regulated and varied and such change of pressure will be reflected in the meter 140. As with the apparatus of FIG. 6, the electric motor 124 need operate only when push button 133 is operated to operate the valve 128 and increase the pressure in the system. The motor can be at rest at other times and the pressure in the hydraulic system operating in conjunction with accumulator-like action of the mercury reservoir 58 and diaphragm 57 will serve to maintain the stroke at a desired range.

I claim:

1. In combination with a vibratory apparatus having a work member supported on isolation springs, an exciter connected to the work member by a spring system for imparting a vibratory, stroke-generating force to the work member, a constant speed electric motor carried by the exciter, a shaft driven by the motor, a counterweight wheel carried at each end of the shaft, a fixed eccentric weight on each counterweight wheel, a movable weight means on each counterweight wheel, said movable weight means including a first fluid reservoir on the counterweight wheel on one side of the axis of rotation thereof, a second fluid reservoir on the counterweight wheel on the other side of said axis and adjacent the fixed eccentric weight the second reservoir being closer to said axis than the first reservoir, a fluid conduit interconnecting the reservoirs, the positions of the reservoirs relative to the axis biasing the fluid in the second reservoir to flow through said conduit to the first reservoir upon rotation of the counterweight wheel, a diaphragm in the first reservoir dividing the reservoir into a first chamber containing said fluid and a second chamber, control means comprising a hydraulic fluid conduit connected to said chamber, a hydraulic pump having its discharge connected to said conduit, a hydraulic fluid reservoir, means connecting the intake of the pump to the hydraulic reservoir, signal generating means for generating an electrical signal reflecting the length of stroke of the work member, a controller for comparing the signal of the signal generating means with a signal reflecting the desired stroke, a first solenoid operated valve for controlling the connection between the pump and said conduit, a second solenoid operated valve for connecting said conduit to the reservoir and means controlled by said controller for operating said valves.

2. In combination with a vibratory apparatus having a work member supported on isolation springs, an exciter connected to the work member by a spring system for imparting a vibratory, stroke-generating force to the work member, a constant speed electric motor, a shaft mounted for rotation on the exciter and rotated by the motor, a counterweight wheel carried at each end of the shaft, a fixed eccentric weight on each counterweight wheel, a movable weight means on each counterweight wheel, said movable weight means including a first fluid reservoir on the counterweight wheel on one side of the axis of rotation thereof, a second fluid reservoir on the counterweight wheel on the other side of said axis and adjacent the fixed eccentric weight the second reservoir being closer to said axis than the first reservoir, a fluid conduit interconnecting the reservoirs, the positions of the reservoirs relative to the axis biasing the fluid in the second reservoir to flow through said conduit to the first reservoir upon rotation of the counterweight wheel, a diaphragm in the first reservoir dividing the reservoir into a first chamber containing said fluid and a second chamber, control means comprising a hydraulic fluid conduit connected to said second chamber, a hydraulic pump having its discharge connected to said conduit, a hydraulic fluid reservoir, means connecting the intake of the pump to the hydraulic reservoir, signal generating means for generating an electrical signal reflecting the length of stroke of the work member, a controller for comparing the signal of the signal generating means with a signal reflecting the desired stroke, and means operated by the controller for controlling the pressure of hydraulic fluid in said conduit.

* * * * *